United States Patent
De Schepper (10) Patent No.: US 9,448,553 B2
(45) Date of Patent: Sep. 20, 2016

(54) CAM INTEGRATED CNC CONTROL OF MACHINES

(71) Applicant: D.P. TECHNOLOGY CORP., Camarillo, CA (US)

(72) Inventor: Frank Erik Marino De Schepper, Overijse (BE)

(73) Assignee: D.P. Technology Corp., Camarillo, CA (US)

( * ) Notice: Subject to any disclaimer, the term of this patent is extended or adjusted under 35 U.S.C. 154(b) by 483 days.

(21) Appl. No.: 13/920,945

(22) Filed: Jun. 18, 2013

(65) Prior Publication Data

US 2013/0338807 A1 Dec. 19, 2013

Related U.S. Application Data (60) Provisional application No. 61/661,458, filed on Jun. 19, 2012.

(51) Int. Cl.
*G05B 19/4097* (2006.01)
*G05B 19/414* (2006.01)

(52) U.S. Cl.
CPC ....... *G05B 19/4145* (2013.01); *G05B 19/4097* (2013.01); *G05B 19/414* (2013.01); *G05B 2219/33099* (2013.01); *G05B 2219/35012* (2013.01); *Y02P 90/265* (2015.11)

(58) Field of Classification Search
CPC ............ G05B 19/4097; G05B 19/414; G05B 19/4145; G05B 2219/33099; G05B 2219/35012; Y02P 90/265
USPC .......................................................... 700/96
See application file for complete search history.

(56) References Cited

U.S. PATENT DOCUMENTS

| | | | |
|---|---|---|---|
| 5,926,389 A | * | 7/1999 | Trounson ............. G05B 19/251 700/187 |
| 6,363,298 B1 | | 3/2002 | Shin et al. |
| 6,447,223 B1 | | 9/2002 | Farah et al. |
| 6,591,158 B1 | | 7/2003 | Bieterman et al. |
| 6,745,100 B1 | | 6/2004 | Lermuzeaux |
| 6,795,749 B2 | | 9/2004 | Suh et al. |
| 6,804,568 B1 | * | 10/2004 | Miyazaki ........... G05B 19/4097 700/17 |

(Continued)

FOREIGN PATENT DOCUMENTS

| | | |
|---|---|---|
| CN | 1461428 A | 12/2003 |
| CN | 1521583 A | 8/2004 |

(Continued)

OTHER PUBLICATIONS

International Search Report for Serial No. PCT/US2013/046384 mailed Feb. 12, 2014.

(Continued)

*Primary Examiner* — Kenneth M Lo
*Assistant Examiner* — Michael J Huntley
(74) *Attorney, Agent, or Firm* — Brooks Acordia IP Law, P.C.; Pejman Yedidsion (57) ABSTRACT

Systems and Methods for Computer Numerically Controlled (CNC) devices comprising a CNC integrated Computer-Aided Manufacturing (CAM) controller configured to input a CAD file and output a CAM file and a CAM integrated CNC controller configured to input the CAM file and output at least one command for at least one servo controller of a set of one or more servo controllers.

11 Claims, 6 Drawing Sheets

(56) References Cited

U.S. PATENT DOCUMENTS

| | | | |
|---|---|---|---|
| 6,895,299 B2* | 5/2005 | Red | G05B 19/4097 700/182 |
| 6,907,313 B2* | 6/2005 | Matthews | G05B 19/4097 700/103 |
| 7,283,888 B2 | 10/2007 | Evans et al. | |
| 7,333,868 B2* | 2/2008 | Trammell | G06Q 30/0603 700/97 |
| 7,552,002 B2 | 6/2009 | Endo et al. | |
| 8,271,105 B2* | 9/2012 | Brown | B25J 9/1602 700/188 |
| 8,972,040 B2* | 3/2015 | Kimura | G05B 19/40932 700/187 |
| 2003/0018677 A1* | 1/2003 | Mathur | H04L 27/2628 708/550 |
| 2003/0050726 A1* | 3/2003 | Jaffrey | G05B 19/4097 700/182 |
| 2003/0171842 A1* | 9/2003 | Teramoto | G05B 19/4097 700/182 |
| 2004/0024472 A1* | 2/2004 | Evans | G05B 19/4097 700/2 |
| 2004/0158335 A1 | 8/2004 | Fujibayashi et al. | |
| 2006/0095142 A9 | 5/2006 | Evans et al. | |
| 2006/0239386 A1* | 10/2006 | Endo | G05B 19/414 375/343 |
| 2008/0004745 A1* | 1/2008 | Nasu | G05B 19/4097 700/182 |
| 2008/0058984 A1 | 3/2008 | Gray et al. | |
| 2008/0141534 A1* | 6/2008 | Hilliard | A61C 7/02 29/896.11 |
| 2008/0161965 A1* | 7/2008 | Haines | G05B 19/409 700/182 |
| 2008/0306620 A1* | 12/2008 | Mutscheller | G05B 19/4097 700/109 |
| 2009/0112354 A1* | 4/2009 | El-Wardany | F01D 5/005 700/160 |
| 2010/0324720 A1* | 12/2010 | Zhan | G05B 19/414 700/162 |
| 2011/0153052 A1* | 6/2011 | Pettibone | G06F 17/5004 700/98 |
| 2011/0247214 A1* | 10/2011 | Huge | A61C 7/002 29/896.11 |

FOREIGN PATENT DOCUMENTS

| | | |
|---|---|---|
| CN | 101923335 A | 12/2010 |
| CN | 101501588 B | 9/2012 |
| EP | 0970409 B1 | 9/2002 |
| WO | 9841910 A1 | 9/1998 |
| WO | WO 00/28393 | 5/2000 |
| WO | 03019454 A1 | 3/2003 |
| WO | 2006102517 A2 | 9/2006 |

OTHER PUBLICATIONS

European Search Report for Serial No. EP13807838, mailed May 18, 2016.

* cited by examiner

CAM INTEGRATED CNC CONTROL OF MACHINES

CROSS-REFERENCE TO RELATED APPLICATIONS

This application claims priority to and the benefit of Provisional Patent Application No. 61/661,458 filed Jun. 19, 2012, the contents of which are hereby incorporated by reference herein for all purposes.

TECHNICAL FIELD

The invention in its several embodiments relates generally to Computer-Aided Manufacturing (CAM) systems and Computer Numerically Controlled (CNC) machines and specifically to the integration of machine tool program generation by means of CAM systems, and machine tool axes control by means of CNC controllers and servo controllers.

BACKGROUND

"Part programs" are programs in a machine language that are generated by CAM systems. CAM systems are the interface between the Computer-Aided Design (CAD) design, i.e., the geometric design of a part, and the CNC machine specifications. The first CNC controllers used a standard machine code called EIA/ISO 6983, i.e., a G- and M-code program. This standard is still widely used today. However, there are a number of weaknesses in this standard. First, it is essentially a description of a tool trajectory in terms of lines (G01), circles (G02 and G03), and rapid traverse displacements (G00). For complex parts, e.g., three-dimensional (3D) parts, there may be a need to discretize and approximate a spline curve with small G01 lines, which are then re-assembled by the CNC to form a new spline curve. Second, there are problems of accuracy due to the fact that the coordinates must be written down in a text file. Third, the CNC Operator alters the speeds and feeds to his or her convenience in a way that is inherently unknown to the CAM system, which may cause inefficiencies.

Many efforts have been made to cope with these problems. A new standard, 14649 STEP-NC (STEP-NC), was created with the intention of replacing the old standard: EIA/ISO 6983. The goal of STEP-NC is to be an extensive description of the toolpath in a machine independent form, including tolerances, such that the toolpath can still be changed and measured on the CNC. However, this is quite impossible, because a toolpath is in principle a "tool motion." Therefore, the toolpath is always linked with the machine geometry and the physical limits of the machine. The ISO standard, i.e., G- and M-codes, is merely coordinates and feedrates, whereas the STEP standard has as basic strategy in the cutter file that allows the operator to specify the geometry and the desired precision. However, it is still up to the CNC, i.e., a STEP CNC, to translate this information into cutter speeds and feeds. The STEP approach does not consider that a toolpath is not merely a geometry, but also a tool path, i.e., a tool that moves along a path. All machines have certain areas or directions where the toolpath may be difficult, and one cannot generate a toolpath independently from a machine.

Another effort to solve these problems is by directly calculating the servo controller commands in the CAM system by bridging the interface between the CAM computer and the CNC controller. However, this solution is not optimal, as it is impossible to change the speeds, i.e., the CNC override function, on the CNC. The authors and/or inventors of this approach argue that the operators should not change the speed on the machine anymore. However, a static speed is not practicable due to how parts are machined. In the ISO standard, the feedrate is specified by the F-command, and is ideally sourced from a cutting database containing verified speeds for a certain material class and a corresponding tool. When new materials are used, the speeds must be changed. Additionally, for certain curvatures, the speed should be adapted. Depending on the CNC machine being used, the dynamics of the CNC machine may not allow for the feedrates specified in the cutting database for the curvature to be machined. For these reasons, every part should ideally be first executed at a low speed. Then, in small increments, the speed may be increased in function based on the experience of the operator. In some cases, e.g., large volumes being produced, the part may be optimized more than any existing CAM system, and speeds higher than 100% may be tested. Small cutting problems may even be optimized via the operator changing the speeds and the cutting conditions on the machine.

Another effort to solve these problems is by verifying the machining part program in the CAM system before sending it to the CNC machine. Other variations offer a simulation of the CNC Software off-line. The disadvantage of this approach is that because there are so many CNC parameters to be set, that one may never be sure if the simulation is truly identical to the CNC system on the machine. Therefore, a verified off-line simulation may still cause problems when executed on a CNC machine.

Finally, efforts to solve these problems have involved putting the CAM software on the same processing unit as the CNC. In some versions, both units may run on the same processor. Some have proposed reading a CAD-file by a CAD-interpreter that is located on the CNC processor. This interpreter would then generate a Motion-Object, i.e., a file that contains both toolpath and tool trajectory information. This is an improvement on the EIA/ISO 6983 code interface, but it does not address nor solve the unpredictable behavior of a CNC against the programmed toolpath.

SUMMARY

Exemplary system embodiments may include a Computer Numerically Controlled (CNC) system that may comprise: a CNC integrated Computer-Aided Manufacturing (CAM) controller, where the CNC integrated CAM controller may be configured to receive a Computer-Aided Design (CAD) file and output at least one CAM file; and a CAM integrated CNC controller, where the CAM integrated CNC controller may be configured to: receive the at least one CAM file, and output at least one command for at least one servo controller of a set of one or more servo controllers. In some embodiments, a user, via a user interface of the CAM integrated CNC controller, may modify at least one of: the received CAM file and the outputted at least one command for the at least one servo controller. In additional system embodiments, the CNC integrated CAM controller may be configured to determine, by the CAM, at least one of: a tool speed, a tool acceleration, and at least one servo motor current. In additional system embodiments, the CAM integrated CNC controller may be configured to control, by the CAM, at least one of: a tool speed, a tool feed, and a tool acceleration. In additional system embodiments, at least one machine parameter in the CNC integrated CAM controller may correspond to at least one machine parameter of the CAM integrated CNC controller. In additional system embodiments, the CAM integrated CNC controller may be further configured to: display, by the CAM, at least one of: a real-time limit for at least one cutting tool; and at least one alternative toolpath strategy for the real-time limit. In additional system embodiments, the real-time limit may be a limit in cutting speed. In additional system embodiments, the real-time limit may be set by a Determination of the Kinematics Parameters module configured to set at least one of: a maximum velocity of each servo axis and a maximum acceleration of each servo axis. In additional system embodiments, the user modified output of the at least one command for the at least one of the servo controllers may comprise at least one of: a feedhold command function, a cyclestart command function, and an override command function. In additional system embodiments, the output of the at least one CAM file from the CNC integrated CAM controller may be received by the CAM integrated CNC controller via at least one of: a LAN connection and a memory device. In additional system embodiments, the at least one CAM file may comprise a stored CAM design.

Exemplary method embodiments may include a method of modifying a Computer Numerically Controlled (CNC) machine that may comprise: integrating a CNC controller that may be configured to determine speeds, accelerations, and servo motor currents with a Computer-Aided Manufacturing (CAM) system, where the CNC integrated CAM system may be configured to receive a Computer-Aided Design (CAD) file and output at least one CAM file; integrating a CAM system configured to edit a CAM file with a CNC controller, where the CAM integrated CNC controller may be configured to receive the at least one CAM file and output at least one command for at least one servo controller of a set of one or more servo controllers; and modifying, via a user interface of the CAM integrated CNC controller, at least one of: the received CAM file and the outputted at least one command for the at least one servo controller. Additional method embodiments may further comprise determining one or more parameters of one or more servo controllers, where the determined one or more parameters of the one or more existing servo controllers may be entered into the CNC integrated CAM system and the CAM integrated CNC controller.

Exemplary method embodiments may also include a method comprising: inputting a geometry from a Computer-Aided Design (CAD) file; defining, by a Computer Numerically Controlled (CNC) integrated Computer-Aided Manufacturing (CAM) system, a tool that moves along a path; creating, by the CNC integrated CAM system, one or more features and a set of one or more associated operations; performing, by the CNC integrated CAM system, one or more simulations, where the one or more simulations may be performed using an integrated Virtual Machine Simulator that utilizes a Determination of Kinematics Parameters module and a Interpolation and Distribution module; and determining, by the CNC integrated CAM system, a CAM file that may be based on an iterative loop of the inputting, defining, creating, and performing steps. In additional method embodiments, the Determination of Kinematics Parameters module may protect a set of one or more servo amplifiers to ensure that no physical limits are exceeded. In additional method embodiments, the Interpolation and Distribution module may ensure that no loss of precision occurs by using the exact mathematical representation as the CAM integrated CNC controller.

BRIEF DESCRIPTION OF DRAWINGS

Embodiments may be illustrated by way of example and not limitation in the figures of the accompanying drawings, and in which.

DETAILED DESCRIPTION

Figure 1:
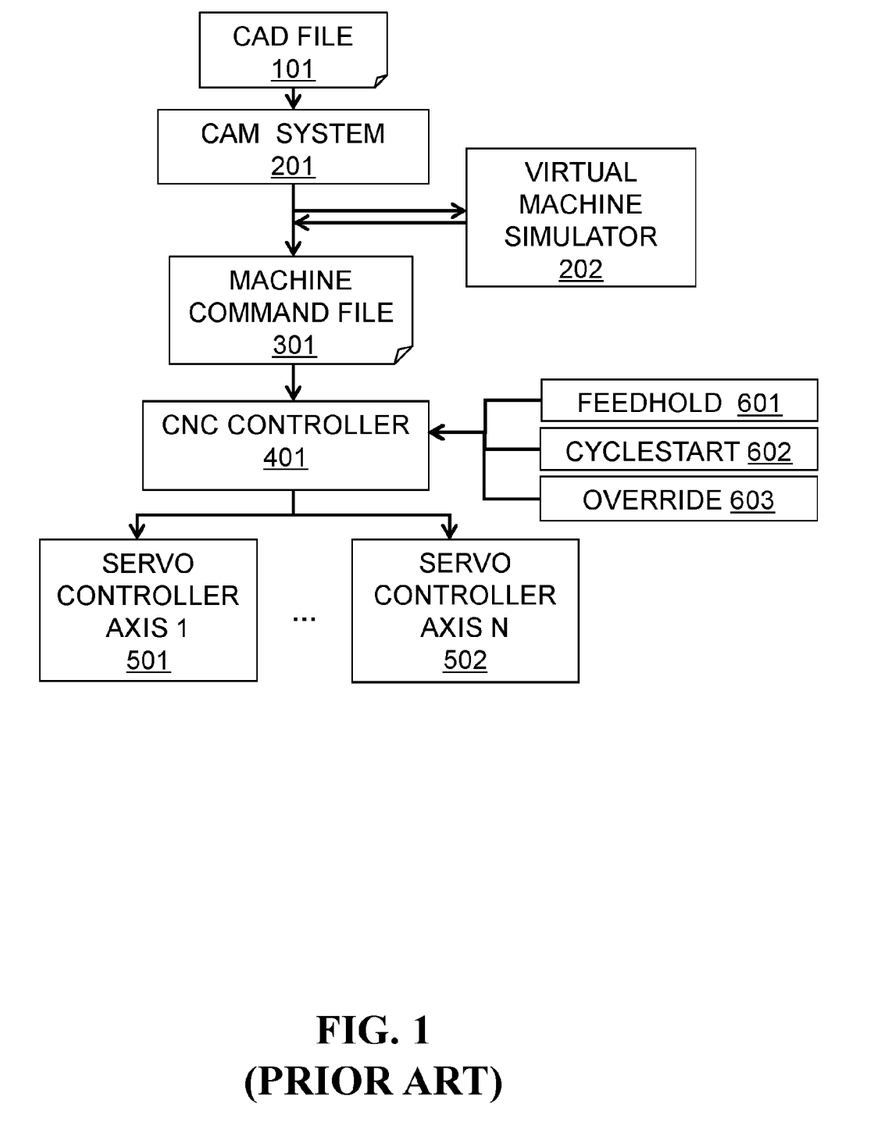
FIG. 1 depicts, in a top-level flowchart, a prior art CAM system and CNC controller.

FIG. 1 depicts, in a top-level flowchart, a general environment of a prior art CAM system (201) and a CNC controller (401). A CAD file (101), generated by a CAD system, is the general input of a CAM system (201). In some cases, the CAD data may be entered directly into the CAM system (201). Such systems may also provide basic CAD functions.

The main purpose of a CAM system (201) is to transform the CAD file (101), which contains geometrical information about a part, into a Machine Command File (301), which contains sequential commands for a particular CNC machine. The Machine Command File (301) may also be called a Cutter Location File. The Machine Command File (301) may be written according to a standard machine code, e.g., the EIA/ISO 6983 standard.

In some cases, the Machine Command File (301) may be checked by a Virtual Machine Tool Simulator (202). This verification process may ensure that the generated code will work on the CNC machine, and an advantage to this simulation is that it may avoid the need for later on-machine verification depending on the CNC machine used and the complexity of the part to be verified. On-machine verification may result in large non-cutting times, or dead times, and is therefore non-desirable in some circumstances. The Machine Command File (301) may then be input, e.g., by a USB connection or a LAN connection, into the CNC controller (401).

The CNC controller (401) processes the Machine Command File (301) based on the directives of an operator. The operator can issue a feedhold (601) command, a cyclestart (602) command, or a speed override (603) command. The CNC itself knows all of the machine limits and decides on the ultimate speeds, feeds, and accelerations. These decisions generate commands for at least one of the servo controllers (501,502).

Figure 2:
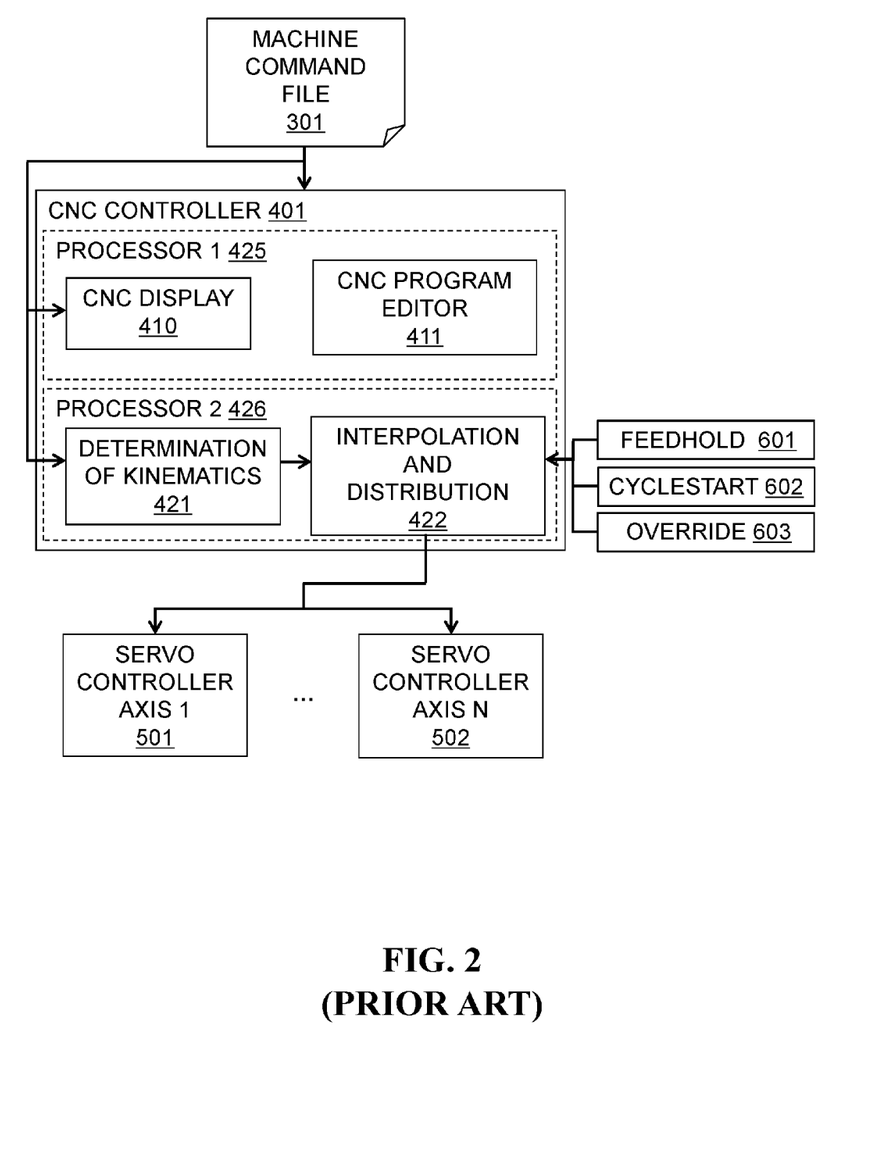
FIG. 2 depicts, in a functional block diagram, a prior art CNC controller.

FIG. 2 depicts, in a functional block diagram, additional details of the contents of a prior art CNC controller (401). Such a CNC controller (401) may contain two processors: a first processor (425) and a second processor (426). These processors (425,426) may be found in older micro-controllers in an embedded environment, whereas present-day PC architectures may be in the form of Industrial PCs. Advanced designs may do both tasks on one Industrial PC with different operating systems. The first processor (425) may handle the Man Machine Interface (MMI). Modules in the first processor (425) may include a CNC display (410) and a CNC program editor (411). The second processor (426) may handle translating the Machine Command Code contained in the Machine Command File (301) to sample commands that may be sent to at least one of the servo controllers (501,502). Modules in the second processor (426) may include a Determination of the Kinematics Parameters (421) module and an Interpolation and Distribution (422) module. The Determination of the Kinematics Parameters (421) module may be a physical element that protects the servo amplifiers, and the entire CNC machine, to ensure that no physical limits are exceeded. In addition, the Determination of the Kinematics Parameters module (421) ensures that the machine moves and cuts with quality, and is based on a set of CNC parameters, e.g., a maximum velocity of each servo axis and an acceleration of each servo axis.

Figure 3:
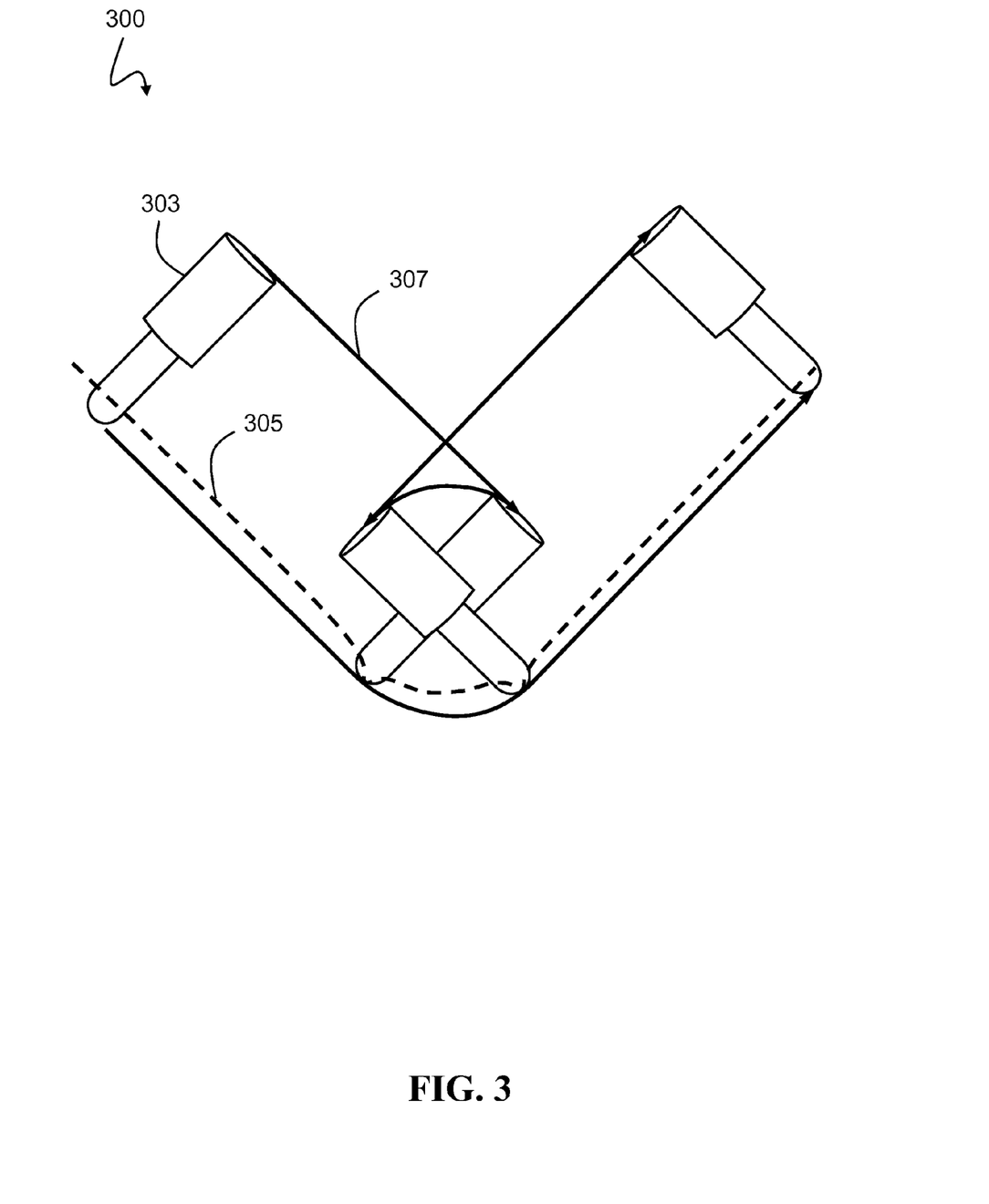
FIG. 3 depicts a perspective view of a problematic toolpath showing the tool space and the machine space.

FIG. 3 depicts a perspective view of a problematic toolpath (300) showing the tool space (305) and the machine space (307). A toolpath is not merely a geometry, but also a tool path, i.e., a tool that moves along a path. All machines have areas or directions where the toolpath may be difficult to navigate. The smooth toolpath for the endpoint of the tool (303) in FIG. 3, becomes a problem in machine space due to the tool positioning required and corresponding CNC machine limits to achieve these tool position changes.

Figure 4:
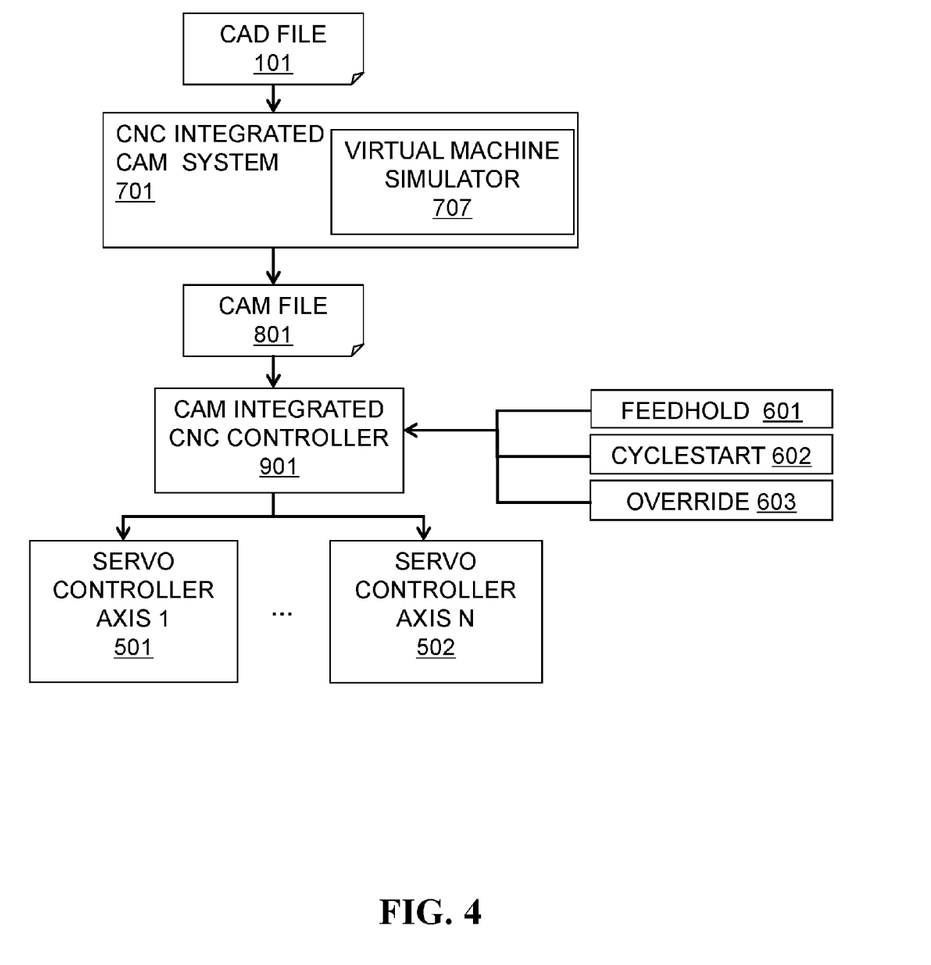
FIG. 4 depicts, in a top-level flowchart, an exemplary embodiment of the integrated CAM and CNC system.

FIG. 4 depicts, in a top-level flowchart, an exemplary embodiment of the integrated CAM and CNC system. The CAM system is a CNC integrated CAM system (701). A Virtual Machine Simulator (707) is now integrated inside the CAM system (701). While the CNC simulator was only used as an optional indicator in the prior art (202, FIG. 1), it is presently integrated into the CNC integrated CAM system (701). The CNC controller is a CAM integrated CNC controller (901). The input of the CAM integrated CNC controller (901) is a CAM File (801), which may be comprised of one or more CAM files used to store a CAM design. The CNC functions of a feedhold (601) command, a cyclestart (602) command and an override (603) command are also available.

Virtually all CNC machines may be equipped with the present system. In some embodiments, existing CNC machines may be retrofitted with this system and the existing servo controllers may be retained so long as their parameters are input into the CNC integrated CAM system (701). In the present exemplary embodiment, the CNC integrated CAM system (701) and the CAM integrated CNC controller (901) are mated. As a result, toolpaths generated with incorrect CNC data will not be executed.

An exemplary embodiment includes a full integration of the CAM system with the CNC system comprising: (a) an integration of the CNC functions that determine speeds, accelerations, and servo motor currents inside the CAM system; and (b) an integration of the CAM editing functions on the CNC system. In this exemplary embodiment, the speeds, feeds, and accelerations are no longer controlled by the CNC, but by the CAM system. Accordingly, the machine parameters in the CNC integrated CAM system (701) may be fine-tuned to each particular CNC machine. In doing this, the limits of the system are known whenever a new feature is programmed into the CNC integrated CAM system (701).

In this exemplary embodiment, there is no requirement to store a Machine Command File (301, FIGS. 1-2), e.g., G-code. From the CNC integrated CAM system (701), a user, or operator, may store the project directly as a CAM file (801). This CAM file (801) may then be sent to the CAM integrated CNC controller (901), where a user will have the same software available on the CAM integrated CNC controller (901) as on the CNC integrated CAM system (701). Accordingly, a user may change any part of the resulting program in the CAM integrated CNC controller (901) as in the off-line CNC integrated CAM system (701). In this exemplary embodiment, both the CNC integrated CAM system (701) and the CAM integrated CNC controller (901) may be on the same processor, and the interface between the two is no longer a Machine Command File (301, FIGS. 1-2), but a software structure. This ensures a high degree of possible precision, because the exact mathematical form as designed by the CAD/CAM system is retained.

An exemplary embodiment integrates the exact CNC Kinematics calculations of the CAM integrated CNC controller (901) into the CNC integrated CAM system (701); and integrates the CAM functions and mathematics of the CNC integrated CAM system (701) into the CAM integrated CNC controller (901). In doing this, the CNC integrated CAM system (701) no longer outputs a Machine Command File (301, FIGS. 1-2), but instead saves the programmed tool trajectory in one or more genuine CAM files (801). These CAM files (801) may then be read by a CNC Controller that has integrated CAM modules: the CAM integrated CNC controller (901).

The exact CNC Kinematics are available at each choice of tool and/or programming of a CAM feature, and one or more options may be compared on the spot. The generation of cutting marks, caused by reversing servo axes, may be immediately shown in the CAM program. The CAM system may indicate, on the spot, limits in cutting speeds. If a limit is reached, a user may react and choose one or more alternative tool path strategies. In this exemplary embodiment, the owner of the Kinematics calculations is no longer the CNC controller, but the CNC integrated CAM system (701). This is accomplished because the CAM software and the CNC software are both available on the CNC machine.

The programmed trajectory, which may be generated off-line, is then transferred to the CNC machine by means of a network, e.g., a LAN connection, or a memory device, e.g., a USB stick. This programmed trajectory does not need to be written down in a Machine Command Language. Instead, it is stored in one or more CAM files (801), thereby keeping track of all design features, options, selections, etc. All these items may still be altered on the CNC machine by the CAM integrated CNC controller (901).

If not altered by a user, the CAM integrated CNC controller (901) will execute the intended trajectory exactly as programmed without any changes of speed or changes of acceleration. If the user decides to change the Kinematics for better cutting performance, the user may use the CAM editing functions or the CNC Override (603) functions.

In a conventional CAM system, a Machine Command File (301, FIGS. 1-2) is inherently limited to writing down coordinates with a certain precision. This precision is generally between 0.01 mm and 0.001 mm. However, in the original CAD file (101, FIG. 1) those values may be smaller than 0.01 mm and/or 0.001 mm, which may result in a small error. This error is half of the precision, e.g., 0.005 mm or 0.0005 mm. Small block lengths are points with a small interval, e.g., 0.1 mm. Specifying small block lengths may cause sudden changes in block orientation due to the discretization. If these points are executed by a conventional CNC machine, then the blockspeed does not increase and the position of the tool changes in jumps. In a 5-axis CNC machine this sudden change in tool orientation may result in chatter, i.e., a vibration of the tool, along with corresponding errors in the workpiece.

During the execution of the trajectory in the present embodiment, the CAM integrated CNC controller (901) may use the exact mathematical representation as adopted by the CNC integrated CAM system (701). This representation may be a line, a circle, a polynomial of $n^{th}$ degree, or any other mathematical function. Through this process, there is no need to take a loss of precision into account. Complex shapes may be precisely manufactured exactly as they are programmed mathematically inside the CNC integrated CAM system (701).

Figure 5:
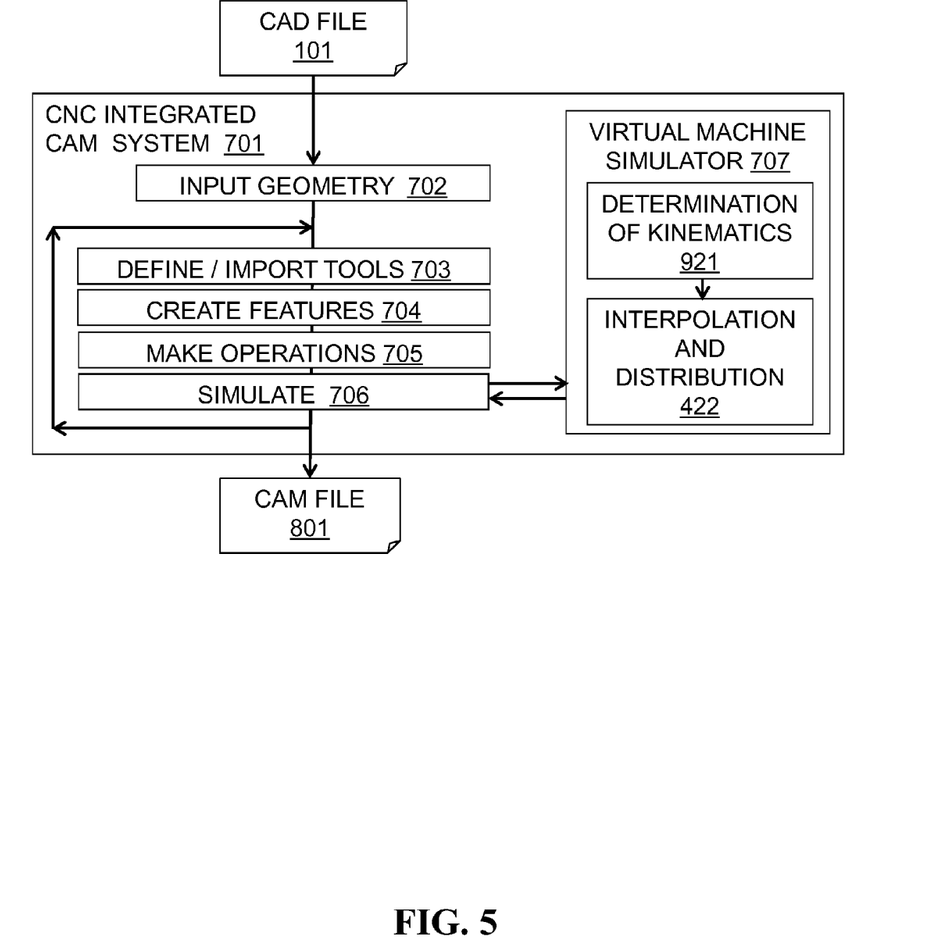
FIG. 5 depicts, in a functional block diagram, an exemplary CNC integrated CAM system.

FIG. 5 depicts, in a functional block diagram, an exemplary CNC integrated CAM system (701). In this embodiment, the Virtual Machine Simulator (707) is integrated into the CNC integrated CAM system (701). In the prior art of FIG. 1, the Virtual Machine Simulator (202, FIG. 1) was used to check the issued Machine Command File (301, FIGS. 1-2), and if an error was found, the entire process had to be redone. In this exemplary embodiment, the Virtual Machine Simulator (707) has access to the same software, the same CNC parameters, and the same Determination of the Kinematic Parameters (921) as the CAM Integrated CNC controller (901, FIGS. 4 and 6). The logic for the Determination of the Kinematic Parameters (921) may then be used whenever a feature is programmed in the CNC integrated CAM system (701). In doing this, each CAM feature may be simulated with the same logic as is available in the CAM integrated CNC controller (901, FIGS. 4 and 6), and each feature may be physically correct. In the prior art of FIGS. 1-2, the CNC controller (401, FIGS. 1-2) has been merely a geometrical organ that defined speed and feeds from a cutting database. An existing part program contains toolpaths, specified in coordinates of lines and circles, or splines using calculation results of the cross section between two surfaces: the tool radius and the mathematically defined surface from the CAD system. Calculating and storing these points may result in lost information. The present system leaves these surfaces in their original form up until the executor of the CNC needs a new point to be calculated. In this exemplary embodiment, the Determination of Kinematics (921) is integrated into the CNC integrated CAM system (701). From the CAD file (101) the CNC Integrated CAM system (701) inputs the geometry (702). Then, in an iterative loop, the CNC integrated CAM system (701) defines and/or imports the tools (703), creates one or more features (704), makes one or more operations (705), and performs one or more simulations (706) where the simulations (706) use an integrated Virtual Machine Simulator (707) that uses the Determination of Kinematics (921) modules and the Interpolation and Distribution (422) modules. Once the process is completed, the CNC integrated CAM system (701) outputs a CAM file (801).

Figure 6:
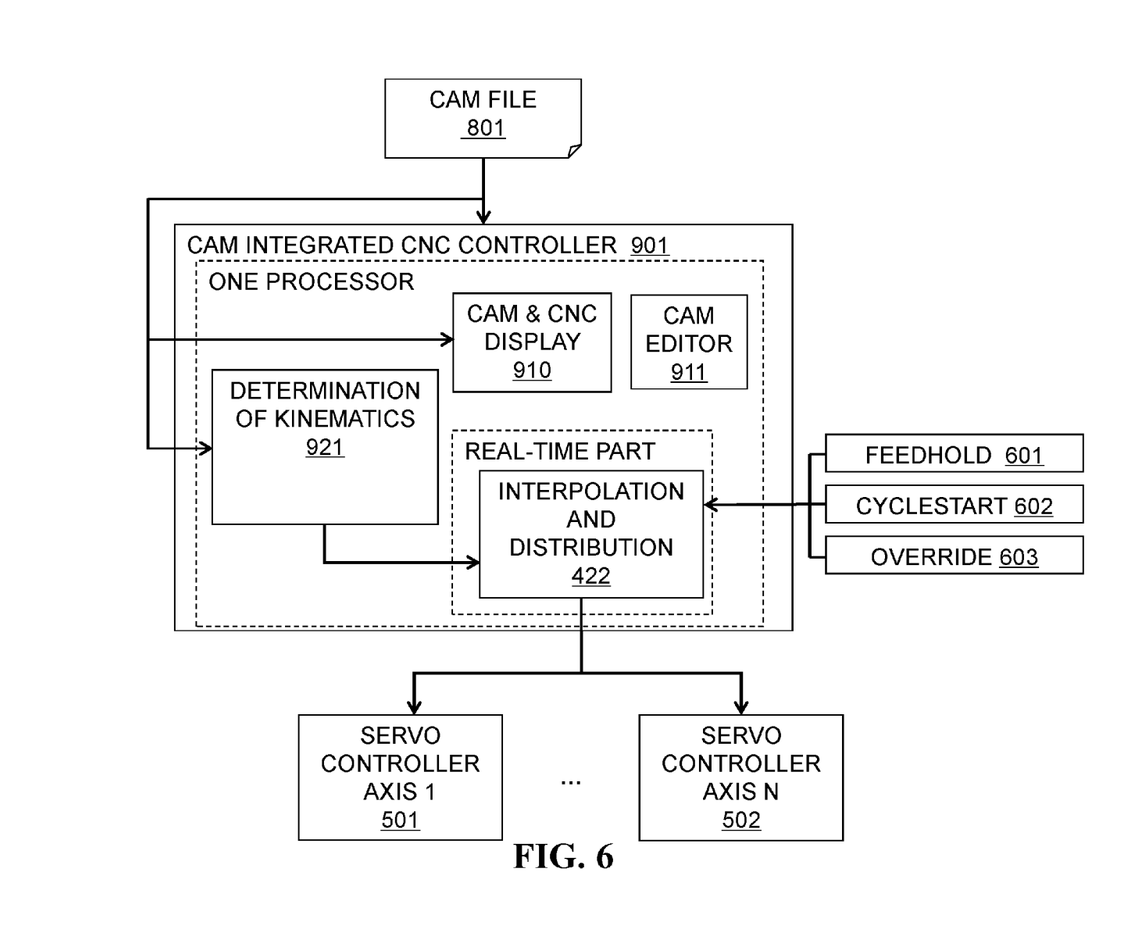
FIG. 6 depicts, in a functional block diagram, an exemplary CAM integrated CNC controller.

An exemplary CNC integrated CAM system (701) may output part programs for more than one CNC machine, so long as the CNC integrated CAM system (701) contains the complete CNC parameters and CNC software for the corresponding CNC machines, and the corresponding CNC machines comprise a CAM integrated CNC controller (901, FIGS. 4 and 6).

FIG. 6 depicts, in a functional block diagram, an exemplary embodiment of CAM functionality integrated into the CAM integrated CNC controller (901). The CAM file (801) may be read by the CAM integrated CNC controller (901). This exemplary CAM file (801) may contain more information than a typical Machine Command File (301, FIGS. 1-2). Every aspect of the toolpath trajectory may be edited on the CAM integrated CNC controller (901) in the same way as on the CNC integrated CAM system (701, FIGS. 4-5). A user may edit the toolpath trajectory using the MMI of the machine via a CAM & CNC display (910) and a CAM editor (911). The Determination of the Kinematics Parameters (921) module protects the servo amplifiers, and the entire CNC machine, to ensure that no physical limits are exceeded. The Interpolation and Distribution (422) module may use the exact mathematical representation as the CAM integrated CNC controller (901) itself. Thereby, no loss of precision may be assured. From the Interpolation and Distribution (422) module in the CAM integrated CNC controller (901), commands for at least one of the servo controllers (501,502) may be issued. Accordingly, the CNC-specific operator functions of feedhold (601), cyclestart (602) and override (603) may all still be utilized.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
   a Computer Numerically Controlled (CNC) integrated Computer-Aided Manufacturing (CAM) controller, wherein the CNC integrated CAM controller is configured to receive a Computer-Aided Design (CAD) file and output at least one CAM file; and
   a CAM integrated CNC controller, wherein the CAM integrated CNC controller is configured to:
   receive the at least one CAM file;
   display at least one of: a real-time limit for at least one cutting tool and at least one alternative toolpath strategy for the real-time limit, wherein if the limit is reached, a user can choose one or more alternative toolpath strategies, thereby toolpaths generated with incorrect CNC data are not executed; and
   output at least one command for at least one servo controller of a set of one or more servo controllers;
   wherein the CNC integrated CAM controller and the CAM integrated CNC controller are mated via full integration of the CNC integrated CAM controller and the CAM integrated CNC controller, and the mated CNC integrated CAM controller and CAM integrated CNC controller do not use or store a Machine Command File, thereby the CAM integrated CNC controller functions to edit the received at least one CAM file; and
   wherein the user, via a user interface of the CAM integrated CNC controller, can modify at least one of:
   the received CAM file and the outputted at least one command for the at least one servo controller.

2. The system of claim 1, wherein the CNC integrated CAM controller is configured to determine, by the CAM, at least one of: a tool speed, a tool acceleration, and at least one servo motor current.

3. The system of claim 1, wherein the CAM integrated CNC controller is configured to control, by the CAM, at least one of: a tool speed, a tool feed, and a tool acceleration.

4. The system of claim 1, wherein at least one machine parameter in the CNC integrated CAM controller corresponds to at least one machine parameter of the CAM integrated CNC controller.

5. The system of claim 1 wherein the real-time limit is a limit in cutting speed.

6. The system of claim 1 wherein the real-time limit is set by a Determination of the Kinematics Parameters module configured to set at least one of: a maximum velocity of each servo axis and a maximum acceleration of each servo axis.

7. The system of claim 1 wherein the user modified output of the at least one command for the at least one of the servo controllers comprises at least one of: a feedhold command function, a cyclestart command function, and an override command function.

8. The system of claim 1 wherein the output of the at least one CAM file from the CNC integrated CAM controller is received by the CAM integrated CNC controller via at least one of: a LAN connection and a memory device.

9. The system of claim 1 wherein the at least one CAM file comprises a stored CAM design.

10. A method of modifying a Computer Numerically Controlled (CNC) machine comprising:
   integrating a CNC controller configured to determine speeds, accelerations, and servo motor currents with a Computer-Aided Manufacturing (CAM) system, wherein the CNC integrated CAM system is configured to receive a Computer-Aided Design (CAD) file and output at least one CAM file;
   integrating a CAM system configured to edit a CAM file with a CNC controller, wherein the CAM integrated CNC controller is configured to receive the at least one CAM file, display at least one of: a real-time limit for at least one cutting tool and at least one alternative toolpath strategy for the real-time limit, wherein if the limit is reached, a user can choose one or more alternative toolpath strategies, thereby toolpaths generated with incorrect CNC data are not executed; and output at least one command for at least one servo controller of a set of one or more servo controllers; and
   modifying, via a user interface of the CAM integrated CNC controller the received CAM file and the outputted at least one command for the at least one servo controller.

11. The method of claim 10 further comprising:
   determining one or more parameters of one or more servo controllers, wherein the determined one or more parameters of the one or more existing servo controllers is entered into the CNC integrated CAM system and the CAM integrated CNC controller.

* * * * *